United States Patent
Hunt et al.

(10) Patent No.: US 10,958,340 B2
(45) Date of Patent: Mar. 23, 2021

(54) MULTI-CHANNEL LIGHT COMMUNICATIONS VIA WAVEGUIDES

(71) Applicant: Telefonaktiebolaget LM Ericsson (publ), Stockholm (SE)

(72) Inventors: Alexander Hunt, Tygelsjö (SE); Andreas Kristensson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/407,518

(22) Filed: May 9, 2019

(65) Prior Publication Data

US 2020/0358528 A1    Nov. 12, 2020

(51) Int. Cl.
| | |
|---|---|
| *H04B 10/80* | (2013.01) |
| *H04J 14/02* | (2006.01) |
| *G02B 6/42* | (2006.01) |
| *H04B 10/116* | (2013.01) |
| *H04B 10/114* | (2013.01) |

(52) U.S. Cl.
CPC ......... *H04B 10/116* (2013.01); *G02B 6/4214* (2013.01); *H04B 10/1143* (2013.01); *H04B 10/801* (2013.01); *H04J 14/0213* (2013.01)

(58) Field of Classification Search
None
See application file for complete search history.

(56) References Cited

U.S. PATENT DOCUMENTS

| | | | | |
|---|---|---|---|---|
| 4,001,577 A | * | 1/1977 | Albanese | G02F 1/125 398/200 |
| 6,885,792 B2 | * | 4/2005 | Eggleton | G02B 6/124 385/37 |
| 7,538,945 B2 | * | 5/2009 | Hikichi | G02B 5/1871 359/566 |
| 7,636,522 B2 | * | 12/2009 | Nagarajan | H01S 5/4031 398/79 |

(Continued)

FOREIGN PATENT DOCUMENTS

| | | |
|---|---|---|
| DE | 10160233 A1 | 6/2003 |
| WO | 2017134412 A1 | 8/2017 |

(Continued)

*Primary Examiner* — Li Liu
(74) *Attorney, Agent, or Firm* — Coats & Bennett, PLLC

(57) ABSTRACT

Devices implementing light communications use waveguides to efficiently collect wavelength-specific light used for the light communications and propagate that collected light to a sensor. More particularly, light comprising a plurality of wavelengths and collected from one or more entrances propagates along a TIR waveguide until disrupted by a diffusive element, which effectively directs the propagating light to one or more sensors. Each sensor detects a subset of the plurality of wavelengths. In so doing, the solution presented herein increases the amount of light available for the light communications and/or reduces the number of sensors needed for the light communications, e.g., by providing light collected from multiple different locations to a single sensor. The waveguide solution presented herein may be implemented inside a device and/or along an exterior surface, e.g., housing or casing, of a device.

20 Claims, 13 Drawing Sheets

(56) References Cited

U.S. PATENT DOCUMENTS

| | | | |
|---|---|---|---|
| 8,594,503 B2* | 11/2013 | Roelkens | G02B 6/12007 |
| | | | 385/15 |
| 9,638,591 B1 | 5/2017 | Sarcia | |
| 2002/0164120 A1 | 11/2002 | Perner | |
| 2003/0235370 A1* | 12/2003 | Taillaert | B82Y 20/00 |
| | | | 385/50 |
| 2010/0098439 A1 | 4/2010 | Shin et al. | |
| 2013/0163089 A1 | 6/2013 | Bohn | |
| 2014/0086586 A1* | 3/2014 | Voutilainen | H04M 1/003 |
| | | | 398/115 |
| 2014/0270758 A1* | 9/2014 | Nejadmalayeri | H04L 5/14 |
| | | | 398/41 |
| 2015/0070327 A1* | 3/2015 | Hsieh | G06F 3/0421 |
| | | | 345/175 |
| 2015/0195044 A1* | 7/2015 | Nejadmalayeri | H04B 10/278 |
| | | | 398/184 |
| 2015/0331545 A1 | 11/2015 | Wassvik et al. | |
| 2015/0341115 A1* | 11/2015 | Ke | G02B 17/006 |
| | | | 398/106 |
| 2016/0070065 A1 | 3/2016 | Qi et al. | |
| 2017/0108375 A1 | 4/2017 | Brueck et al. | |
| 2017/0248734 A1* | 8/2017 | Barfoot | G01J 1/0219 |
| 2018/0176739 A1 | 6/2018 | Zhang et al. | |
| 2018/0205457 A1 | 7/2018 | Scheim et al. | |
| 2018/0302158 A1 | 10/2018 | Norval et al. | |
| 2018/0302159 A1 | 10/2018 | Ritchie | |
| 2019/0041634 A1 | 2/2019 | Popovich et al. | |
| 2019/0056591 A1* | 2/2019 | Tervo | G02B 27/0172 |
| 2019/0114484 A1 | 4/2019 | Keech et al. | |
| 2019/0182441 A1 | 6/2019 | Saleh et al. | |
| 2019/0235252 A1 | 8/2019 | Freedman et al. | |

FOREIGN PATENT DOCUMENTS

| | | |
|---|---|---|
| WO | 2017197013 A1 | 11/2017 |
| WO | 2018115837 A1 | 6/2018 |
| WO | 2018130850 A1 | 7/2018 |

* cited by examiner

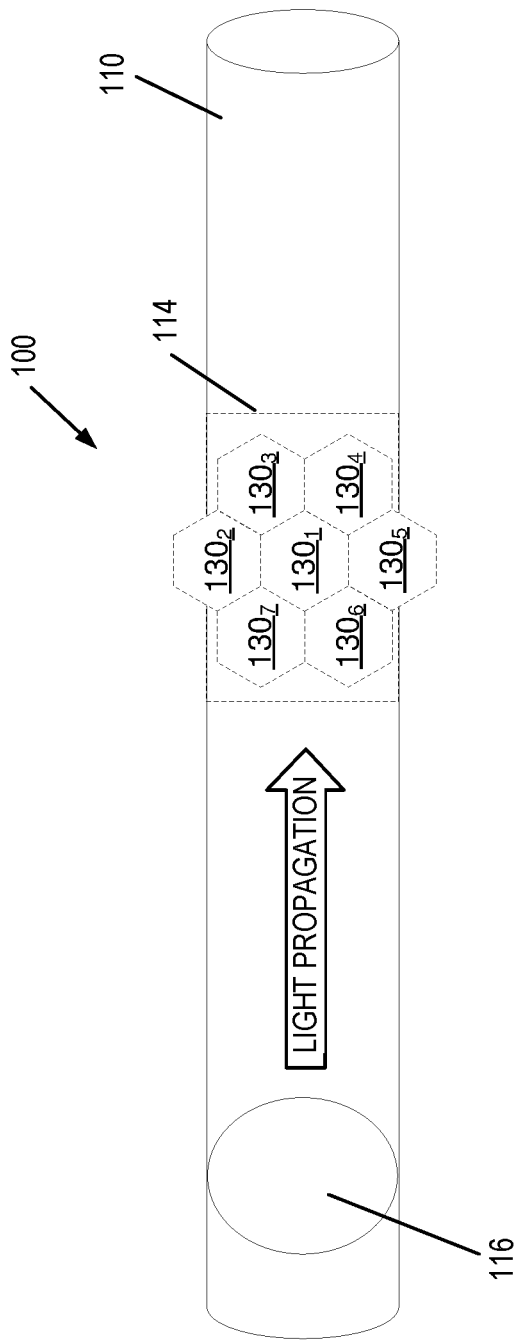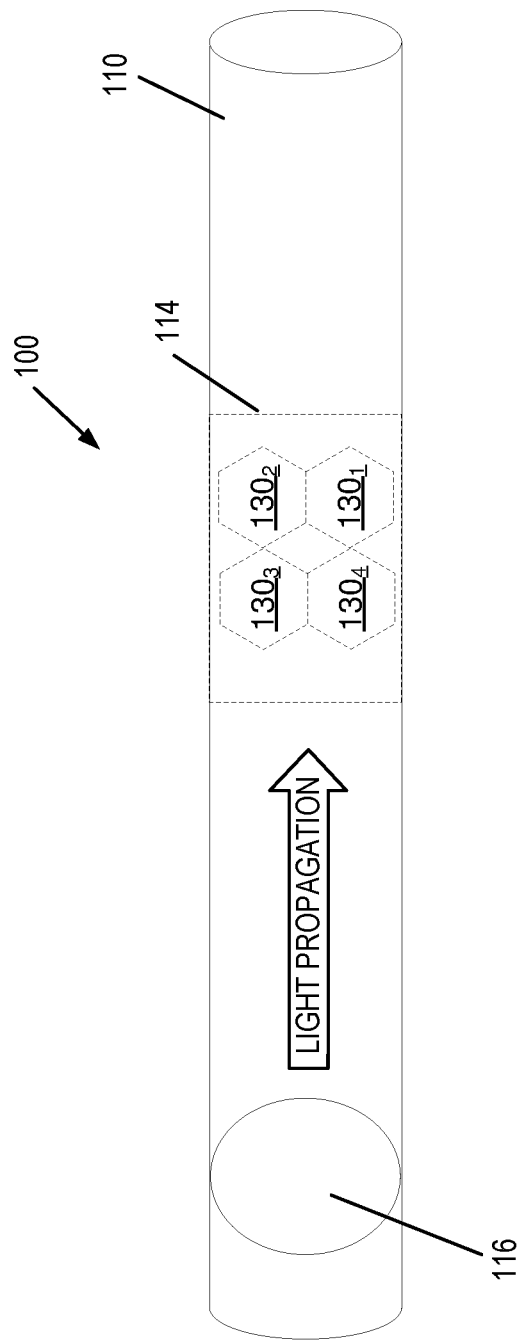

MULTI-CHANNEL LIGHT COMMUNICATIONS VIA WAVEGUIDES

BACKGROUND

WiFi is a wireless technology that uses electromagnetic waves to wirelessly connect multiple devices within a particular area to each other and/or to connect one or more wireless devices within a particular area to the internet. While WiFi has been incredibly useful and popular in recent years, it is expected that the need for more bandwidth will soon lead to replacing WiFi or complementing WiFi with alternative wireless technologies.

Light Fidelity (LiFi), which uses light within certain wavelength ranges for the local area wireless communications, represents one alternative wireless technology that may replace or complement WiFi. LiFi systems rely on visible, infrared, and/or near ultraviolet spectrum waves. By modulating a light source, e.g., a light emitting diode, a LiFi transmitter transmits high speed signals detectable by a photodetector. The photodetector converts the detected light to electrical current, which is further processed by the receiver to interpret the detected light.

The visible light spectrum is ~10,000 times larger than the radio frequency spectrum. LiFi is therefore expected to increase the bandwidth achievable by WiFi alone by a factor of 100. Further, LiFi tends to be more suitable in high density and/or high interference environments, e.g., airplanes, office buildings, hospitals, power plants, etc. Thus, considerable focus has recently been given to improving LiFi technology and/or adapting LiFi technology for specific applications and/or devices.

SUMMARY

The solution presented herein uses waveguides to efficiently collect light used for light communications, particularly wavelength-specific light, and propagates the collected light to a sensor to implement wavelength-specific detection. Such wavelength-specific light collection may involve filtering light at a waveguide entrance to channel wavelength-specific light to a sensor, channeling collected light to wavelength-specific sensor(s), and/or filtering the light at the sensor so that the sensor only detects the desired wavelength(s). As used herein, "wavelength-specific" refers to one or more peak wavelengths that have the largest amplitude of a range of wavelengths. Thus, it will be appreciated that references to "wavelength-specific" generally include some number of wavelengths, e.g., surrounding each peak wavelength, in addition to the peak wavelength(s).

The solution presented herein increases the amount of light available for light communications, and particular for wavelength-specific light communications, even when the light associated with the light communications enters the device at an angle. Further, because multiple waveguides may channel light from multiple collection points to a single sensor, the solution presented herein reduces the number of sensors needed for the light communications. The waveguide solution presented herein may be implemented inside a device and/or along an exterior surface, e.g., housing or casing, of a device. As such, the solution presented herein also enables the implementation of light communications for a wide variety of devices (e.g., cellular telephones, tablets, smartphones, smart watches, smart glasses, etc.) and/or in a wide variety of scenarios.

One exemplary embodiment comprises a detection system for light communications. The detection system comprises a total internal reflection (TIR) waveguide and one or more light sensors. The TIR waveguide comprises a first structure, a diffusive element, and one or more waveguide entrances. The first structure has a first index of refraction, where a second index of refraction adjacent the first structure is less than the first index of refraction such that light for light communications input to the TIR waveguide propagates along the TIR waveguide within the first structure, and where the light comprises a plurality of wavelengths. The diffusive element is disposed along an internal edge of the first structure at a first location of the TIR waveguide, and is configured to disrupt the propagation of the light along the TIR waveguide. Each of the one or more waveguide entrances are at a corresponding second location, where each of the second locations is offset along the TIR waveguide from the first location. Each of the one or more waveguide entrances is configured to collect the light associated with the light communications, and input the collected light to the first structure at the corresponding second location. The one or more light sensors are disposed adjacent an edge of the first structure opposite the first location and are each spaced from the diffusive element by a thickness of the first structure. Each of the one or more light sensors detects a subset of the plurality of wavelengths of the disrupted light, where the said subset of the plurality of wavelengths comprises one or more wavelengths totaling fewer than the plurality of wavelengths.

One exemplary embodiment comprises a method of detecting light associated with light communications. The method comprises collecting light configured for the light communications via one or more waveguide entrances disposed at different first locations along a total internal reflection (TIR) waveguide, where the light comprises a plurality of wavelengths. The TIR waveguide comprises a first structure having a first index of refraction, where a second index of refraction adjacent the first structure is less than the first index of refraction such that light entering the TIR waveguide propagates along the TIR waveguide within the first structure. The method further comprises disrupting the propagation of the light along the TIR waveguide using a diffusive element disposed along an internal edge of the first structure at a second location of the TIR waveguide, where the second location is offset along the TIR waveguide from each of the one or more first locations. The method further comprises detecting the disrupted light using one or more light sensor disposed adjacent an edge of the first structure opposite the second location and spaced from the diffusive element by a thickness of the first structure, where each of the one or more light sensors detects a subset of the plurality of wavelengths of the disrupted light, and where the subset of the plurality of wavelengths comprises one or more wavelengths totaling fewer than the plurality of wavelengths.

According to exemplary embodiments, the detected light is processed according to any known means to determine the information transmitted in the light collected by the detection system, and to convey that information (when appropriate) to a user.

BRIEF DESCRIPTION OF THE DRAWINGS

FIGS. 3A-3B show top views of exemplary waveguide-based light detection systems according to exemplary embodiments of the solution presented herein.

DETAILED DESCRIPTION

Figure 1:
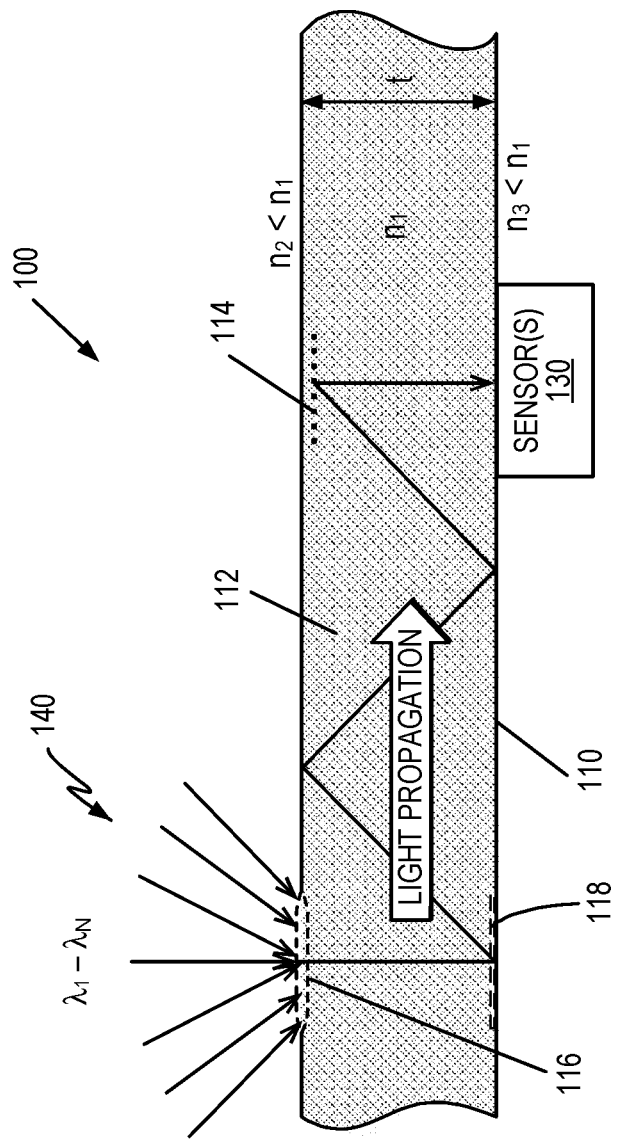
FIG. 1 shows an exemplary waveguide-based light detection system according to exemplary embodiments of the solution presented herein.

The use of light communications, e.g., LiFi, with WiFi or as a replacement for WiFi, has expanded the capabilities of local area wireless communications. However, the devices typically preferable for such communications are small, and have limited space available for the detectors/receivers used for such communications. Further, the space available in these devices continues to decrease due to the continual reduction in size of these devices and/or the continual addition of new features and/or hardware into these devices. For example, wearable devices (e.g., glasses, watches, etc.) are designed to have a minimal size to improve their wearability (e.g., make them lighter, more comfortable, etc.). The limited physical size of many devices, especially when combined with all the functionality intended to be included in such devices, places limitations on the location and/or size and/or number of light sensors that may be included in the device for light communications.

Conventional solutions require a sensor for every light capturing/entrance location of a device. For example, a device that implements light communications may include three openings in a housing of the device, where such openings are intended to, or could be used to, receive external light associated with light communications. In a conventional solution, such a device necessarily includes three sensors, one sensor disposed beneath each of the three openings, to capture the light entering each opening. Because many devices have limited space available for such sensors, such conventional solutions severely limit the number of sensors available for light communications, and thus limit the amount of light that can be collected for light communications and/or the effectiveness of light communications. Further, conventional solutions generally have challenging mechanical requirements regarding the location of the sensor and/or alignment of a sensor with the corresponding opening in order to enable the sensor to capture as much of the light entering the opening as possible. These mechanical limitations may severely limit the location options for the openings.

The solution presented herein solves many problems associated with conventional solutions by using waveguides to channel light from one or more openings to a sensor to facilitate wavelength-specific light communications. In so doing, the solution presented herein reduces the number of sensors used for light communications, enables each sensor to capture more light associated with the light communications, and/or enables flexibility regarding the sensor size, the sensor location in the device, and/or the alignment of the sensor with any particular opening. In particular, the solution presented herein enables any number of openings to be placed anywhere on the device, while also enabling one or more sensors to be placed at any suitable location within the device, which improves the signal quality and reduces the mechanical constraints associated with LiFi.

Figure 2:
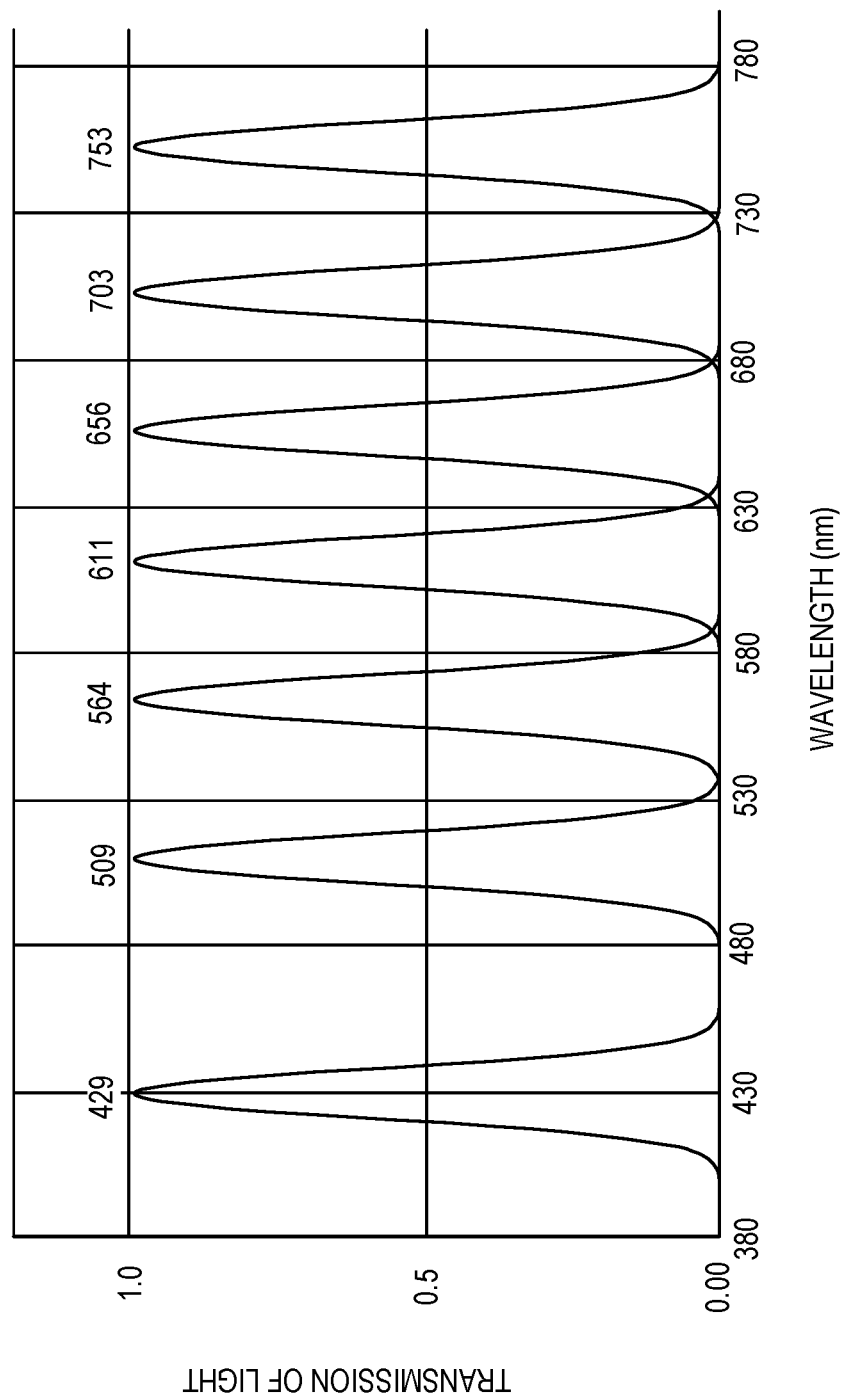
FIG. 2 shows an exemplary plurality of wavelengths applicable to the light detection system disclosed herein.

FIG. 1 shows one exemplary light detection system 100 for light communications according to embodiments of the solution presented herein, where the light used for the light communications comprises a plurality of peak wavelengths, e.g., $\lambda_1$-$\lambda_N$, e.g., as shown in FIG. 2. The light detection system 100 comprises a waveguide 110 and one or more light sensors 130. The waveguide 110 comprises a Total Internal Reflection (TIR) structure 112 through which light propagates, a diffusive element 114, and one or more waveguide entrances 116. The TIR structure 112 has a first index of refraction $n_1$, where indices of refraction, e.g., $n_2$ and/or $n_3$, surrounding/adjacent to the TIR structure 112 is/are less than the first index of refraction $n_1$ such that light input to the waveguide 110 propagates along the waveguide 110 within the TIR structure 112. Diffusive element 114 is disposed along an internal edge of the TIR structure 112 at a predetermined location of the waveguide 110 to disrupt the propagation of the light along the TIR structure 112. Each of the waveguide entrance(s) 116 is at a location laterally offset along the waveguide 110 from the location of the diffusive element 114, where each waveguide entrance 116 collects light 140 associated with the light communications and inputs the collected light 140 to the TIR structure 112 at the corresponding input location. Each of the one or more light sensors 130 detects a subset $\lambda_m$-$\lambda_M$ of the plurality of wavelengths $\lambda_1$-$\lambda_N$, where $((M-m)+1)<N$. To that end, the light sensor(s) 130 is/are disposed adjacent to an internal edge of the TIR structure 112 opposite the location of the diffusive element 114 and generally spaced from the diffusive element 114 by a thickness t of the TIR structure 112 so that the light sensor(s) 130 detect wavelength-specific light disrupted by the diffusive element 114. For example, each of the one or more light sensors 130 may comprise a Photo Sensitive Receptor (PSR) configured to detect the wavelength-specific light disrupted by the diffusive element 114.

The propagation of the light through TIR structure 112 is at least partially controlled by the index of refraction $n_1$ of the TIR structure 112 relative to the surrounding index/indices of refraction. When material(s) surrounding TIR structure 112 have a lower refractive index than the TIR structure 112, TIR structure 112 functions as a TIR layer, which enables the light entering the TIR structure 112 at a TIR angle to propagate along the TIR structure 112 with total internal reflection, and thus with minimal to no loss. While in some embodiments the indices of refraction surrounding TIR structure 112 are all the same, the solution presented herein does not require the index/indices of refraction surrounding the TIR structure 112 to be equal. Instead the solution presented herein only requires that the index of refraction $n_1$ of the TIR structure 112 be greater than each index of refraction of the surrounding material so that light input into TIR structure 112 propagates along the TIR structure 112 with total internal reflection.

The desired index of refraction relationship between the TIR structure 112 and the surrounding structure(s)/material(s) may be achieved in any number of ways. For example, when the TIR structure 112 is a cylindrical tube having a first index of refraction $n_1$, having a second index of refraction $n_2$ surrounding the tube less than the first index of refraction ($n_2 < n_1$) causes the desired total internal reflection in the TIR structure 112. In another example, when the TIR structure 112 is a right rectangular prism having the first index of refraction $n_1$, having a second index of refraction $n_2$ on one side of the TIR structure 112 that is less than the first index of refraction ($n_2 < n_1$), and a third index of refraction $n_3$ on an opposing side of the TIR structure 112 that is also less than the first index of refraction ($n_3 < n_1$), as shown in FIG. 1, causes total internal reflection in the TIR structure 112. In another example, waveguide 110 may be realized using a set of coatings or layers, where each layer/coating represents a different part of the waveguide 110. In this example, one layer may represent a TIR layer (i.e., the TIR structure 112), while one or more layers surrounding the TIR layer has a lower index of refraction than that of the TIR layer, and thus represents a "reflective" layer. Such a reflective layer may also serve as a protective layer that protects the TIR structure 112 from scratches, debris, and/or other foreign objects. Alternatively, a protective layer separate from the reflective layer may be applied between the TIR structure 112 and the reflective layer, where the protective layer has the same or lower index of refraction as the reflective layer. The protective layer may also be used to add print (e.g., text, images, etc.) that when visible to a user of the device 200 identify any desired information related to or about the device 200, e.g., brand name, model name/number, team affiliations, school affiliations, etc.

The diffusive element 114 comprises any material or structure that disrupts the propagation of the light within the TIR structure 112. In some embodiments, the diffusive element 114 may direct the disrupted light to the sensor 130. In other embodiments, the diffusive element 114 may scatter the light such that at least some of the originally propagating light is captured by the sensor 130. In one exemplary embodiment, the diffusive element 114 comprises white or colored paint applied to the inner edge of the TIR structure 112 above the sensor 130. In another exemplary embodiment, the diffusive element 114 is constructed by altering the material at the location of diffusive element 114 so that this location of the TIR structure 112 is no longer flat and/or smooth. For example, machined dots may be placed at the location of the diffusive area 114 or the location of the diffusive area 114 may be etched or roughened.

As noted above, each of the one or more light sensors 130 detects a subset $\lambda_m - \lambda_M$ of the plurality of wavelengths $\lambda_1 - \lambda_N$, where $((M-m)+1) < N$. The plurality of wavelengths comprises a plurality of peak wavelengths suitable for light communications, e.g., 429 nm, 509 nm, 564 nm, 611 nm, 656 nm, 703 nm, and 753 nm, as shown in FIG. 2. In some embodiments, each subset $\lambda_m - \lambda_M$ of the plurality of wavelengths $\lambda_1 - \lambda_N$ may comprise one of the plurality of peak wavelengths or multiple ones of the plurality of peak wavelengths. For example, a first subset may include 429 nm, a second subset may include 509 and 564 nm, etc. It will further be appreciated that some subsets may overlap such that a particular peak wavelength is part of two or more subsets. Further, it will be appreciated that the subset may include additional non-peak wavelengths, e.g., surrounding the peak wavelength(s), and that the solution presented herein is described in terms of subsets of one or more peak wavelengths and/or as wavelength-specific, where wavelength-specific refers to the one or more peak wavelengths of a particular subset but does not exclude the existence of other surrounding, non-peak wavelengths.

Each of the sensor(s) 130 of the solution presented herein may detect a particular subset of the plurality of wavelengths in any number of ways. In one exemplary solution, each sensor 130 may be wavelength-specific such that each sensor 130 is configured to detect a particular subset of the plurality of wavelengths. For example, as shown in the top view of FIGS. 3A-3B, one sensor for each subset of the plurality of wavelengths may be disposed opposite the diffusive element 114 such that each sensor 130 only detects the corresponding peak wavelength(s). In the example of FIG. 3A each sensor detects one of the peak wavelengths of FIG. 2, e.g., sensor $130_1$ detects 429 nm, sensor $130_2$ detects 509 nm, sensor $130_3$ detects 564 nm, sensor $130_4$ detects 611 nm, sensor $130_5$ detects 656 nm, sensor $130_6$ detects 703 nm, and sensor $130_7$ detects 753 nm. It will be appreciated that more sensors 130 may be used if there are more peak wavelengths or fewer sensors 130 may be used if there are fewer peak wavelengths to detect or if each subset includes multiple peak wavelengths. For example, FIG. 3B shows one exemplary embodiment comprising four sensors, where each of the four sensors is arranged opposite diffusive element 114, and where sensor $130_1$ detects 429 nm, sensor $130_2$ detects 509 nm and 564 nm, sensor $130_3$ detects 611 nm and 656 nm, and sensor $130_4$ detects 703 nm and 753 nm. Thus, it will be appreciated that the solution presented herein allows for more or fewer sensors, depending on the number of wavelength subsets.

Figure 4A:
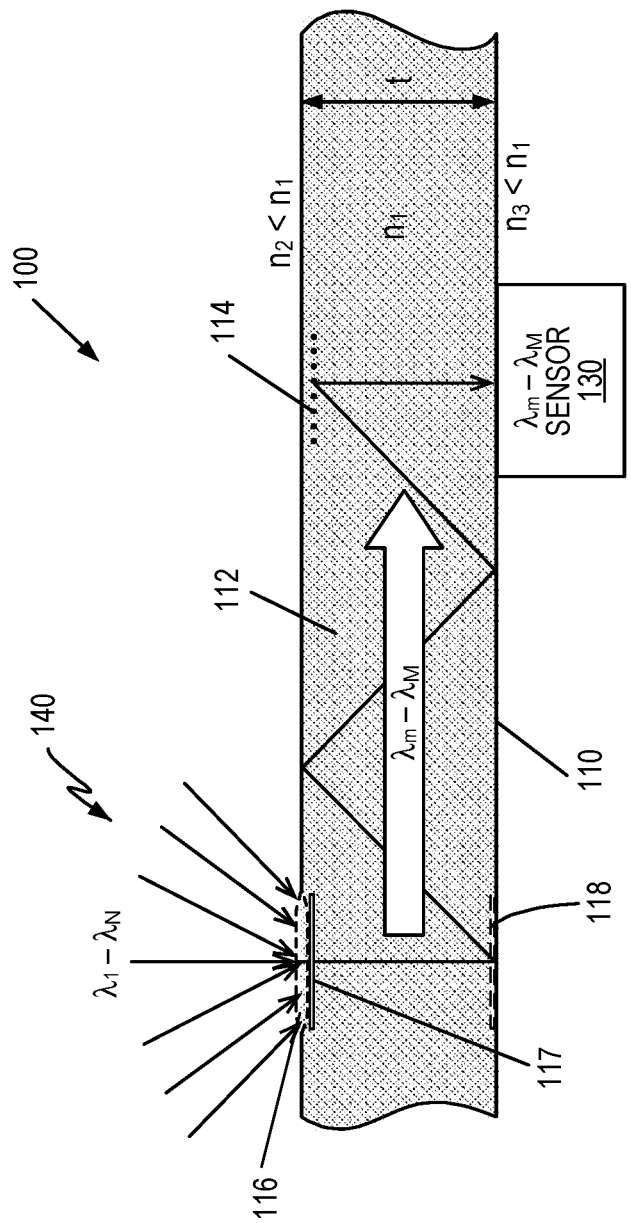
FIGS. 4A-4B show additional exemplary waveguide-based light detection systems according to exemplary embodiments of the solution presented herein.
Figure 4B:
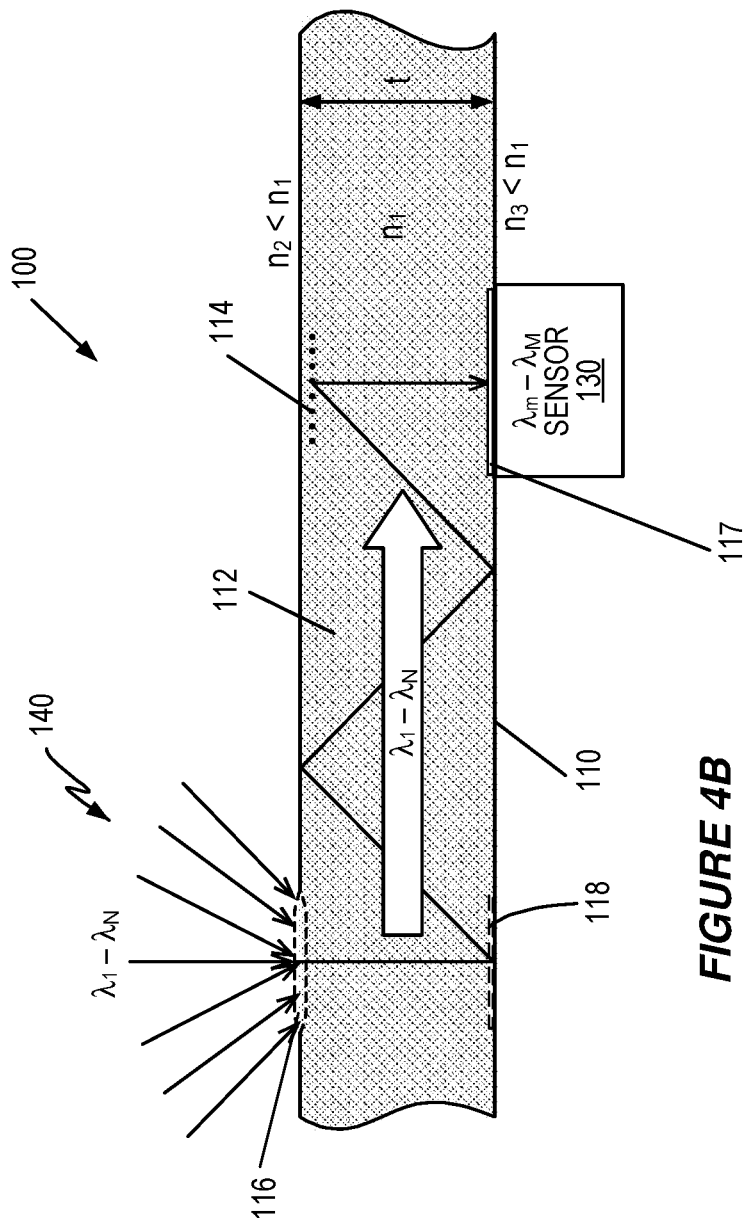

While the figures used to illustrate embodiments of the solution presented herein show hexagonal-shaped sensors 130, it will be appreciated that the sensors 130 are not limited to a hexagonal shape. Each sensor 130 may be any shape and/or size, where the shape and/or size is generally defined based on space constraints and/or manufacturer parameters. Further, the sensors 130 used for the solution presented herein are not required to all be the same size or shape. Further still, it will be appreciated that the solution presented herein does not require that each sensor 130 abut one or more of the other sensors 130, as shown in FIGS. 3A-3B; the sensors 130 may be arranged opposite the diffusive element 114 in any suitable way such that the each sensor 130 detects its corresponding subset of the plurality of wavelengths. In another exemplary embodiment, light destined for each sensor 130 may first pass through a wavelength-specific element 117, e.g., at the waveguide entrance 116 (as shown in FIG. 4A) and/or at the location of the sensor 130 (as shown in FIG. 4B) such that the light input to the sensor 130 only includes the wavelengths in the corresponding subset. In such exemplary embodiments, the sensor 130 used to collect the light disrupted by the diffusive element 114 may also be wavelength-specific, or may be capable of detecting any number of wavelengths, including but not limited to the wavelengths in the corresponding subset.

FIG. 4A shows an exemplary embodiment where the wavelength-specific element 117 is a filter 117 disposed at the waveguide entrance 116, where the filter 117 is configured to pass the peak wavelengths $\lambda_m$-$\lambda_M$ in a particular subset of wavelengths, while blocking the remaining peak wavelength(s) in the plurality of wavelengths. In this embodiment, wavelengths $\lambda_m$-$\lambda_M$ propagate down the waveguide 110 until they are disrupted by the diffusive element 114 and detected by the corresponding sensor 130. As shown in FIG. 4B, the filter 117 may alternatively or additionally be disposed proximate the sensor 130, where the wavelengths captured at the waveguide entrance 116 propagate down the waveguide 110, but only the subset of wavelengths $\lambda_m$-$\lambda_M$ pass to, and are detected by, the sensor 130.

Figure 5:
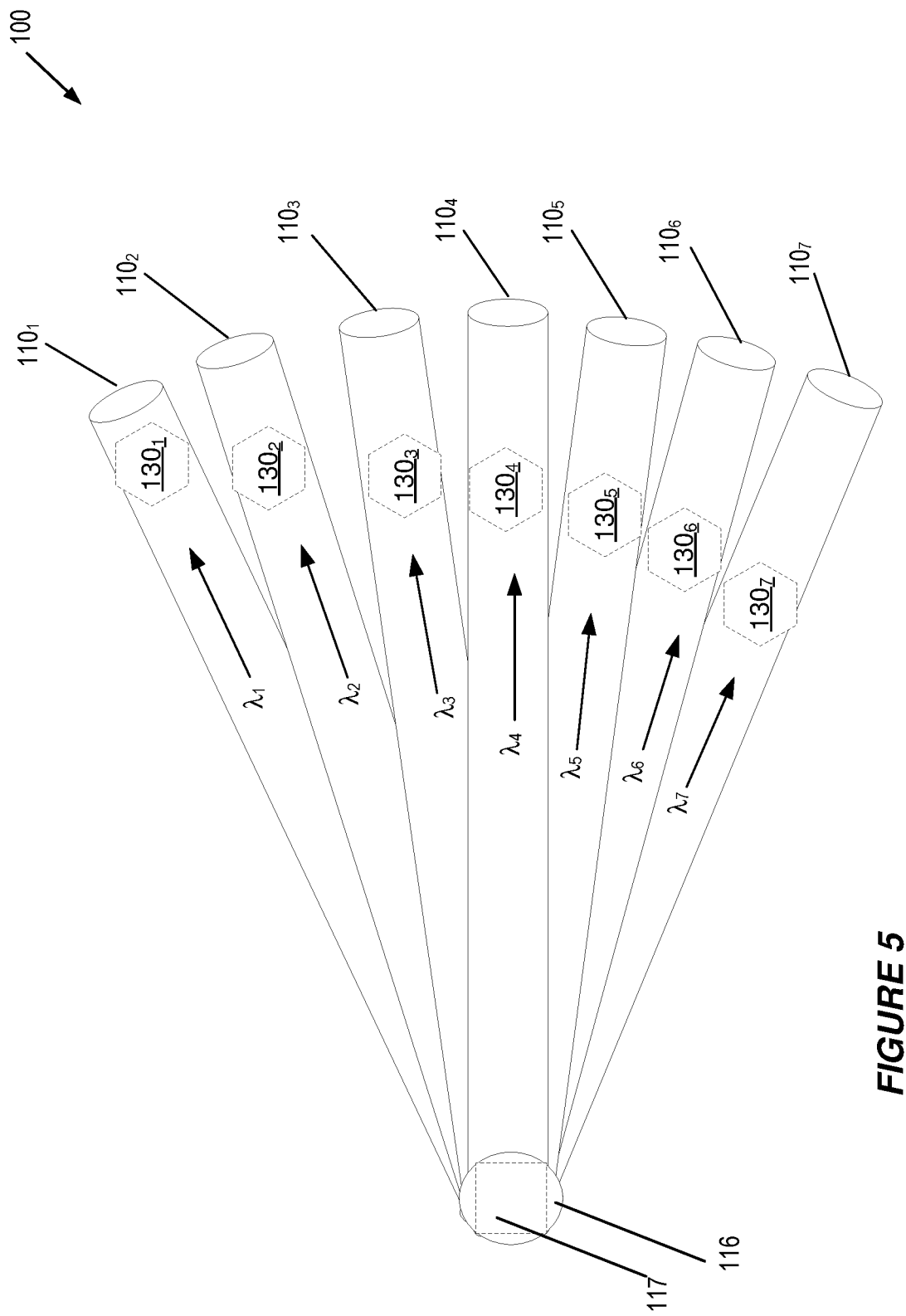
FIG. 5 shows a top view of another exemplary waveguide-based light detection system according to exemplary embodiments of the solution presented herein.

FIG. 5 shows another exemplary embodiment of the solution presented herein, where the wavelength-specific element 117 is a prism 117. Exemplary prisms include, but are not limited to, a dispersive prism (e.g., a refracted prism or a diffraction grating) or a reflective prism. In this embodiment, prism 117 separates the input light into individual subsets of wavelengths, where each subset is input to a subset-specific waveguide 110. For example, if the input light has seven peak wavelengths $\lambda_1$-$\lambda_N$, the prism 117 may separate the input light into seven different directions, where each direction corresponds to one of the peak wavelengths, so that each of the peak wavelengths is input into a separate waveguide 110 for detection by a sensor 130. For the example of FIG. 5, this would result in $\lambda_1$ being input into waveguide $110_1$ for detection by sensor $130_1$, $\lambda_2$ being input into waveguide $110_2$ for detection by sensor $130_2$, $\lambda_3$ being input into waveguide $110_3$ for detection by sensor $130_3$, $\lambda_4$ being input into waveguide $110_4$ for detection by sensor $130_4$, $\lambda_5$ being input into waveguide $110_5$ for detection by sensor $130_5$, $\lambda_6$ being input into waveguide $110_6$ for detection by sensor $130_6$, and $\lambda$ being input into waveguide $110_7$ for detection by sensor $130_7$. It will be appreciated that additional waveguides 110 and sensors 130 may be used if there are more than seven peak wavelengths, and that fewer waveguides 110 and sensors 130 may be used if there are fewer than seven peak wavelengths and/or one or more subsets include multiple peak wavelengths. Further, while FIG. 5 shows a top view of one exemplary prism solution, where the prism 117 fans each of the subsets out in one plane, it will be appreciated that the prism 117 may be configured to separate the wavelengths in any suitable manner and/or direction, and that the solution presented herein would configure the orientation of the waveguides 110 relative to the prism 117 and waveguide entrance 116 as appropriate so that the waveguide 110 receives and directs the corresponding subset of wavelengths to the corresponding sensor 130.

The following provides further details about how the light enters the device and is channeled to the sensor(s) 130. It will be appreciated that these details apply to any individual peak wavelength, subset of peak wavelengths, and/or plurality of peak wavelengths that are separated at some point in the detection system 100, e.g., at the waveguide entrance 116, at the sensor 130, etc. As such, the above-described wavelength-specific aspects apply to each of the multiple openings, multiple sensor, multiple directions, light guiding elements, etc., aspects discussed further below.

As noted above, the light enters the waveguide 110 after first entering a waveguide entrance 116. Each waveguide entrance 116 comprise an opening in the housing of a device 200 configured to collect light 140, e.g., associated with light communications, and input the collected light to the TIR structure 112 of the waveguide 110. Each waveguide entrance 116 is laterally offset from the location of the diffusive element 114/sensor 130, where light 140 collected at one entrance propagates along the waveguide 110 to get to the sensor 130. In some embodiments, the waveguide entrances 116 may comprise just the openings. In other embodiments, the waveguide entrances 116 may include a collection element 124, e.g., a lens or lens system (e.g., FIG. 7), where the collection element 124 is configured to increase the amount of external light 140 that is input into the waveguide 110. When the waveguide entrance 116 includes a collection element 124, generally the collection element 124 will have a wide Field of View (FoV) to increase the amount of collected light. Exemplary lenses include, but are not limited to a Fresnel lens 124a (FIG. 8), a plano-convex lens 124b (FIG. 8), etc. It will be appreciated that the use of any collection element 124 in one or more waveguide entrances 116 is optional.

Figure 6:
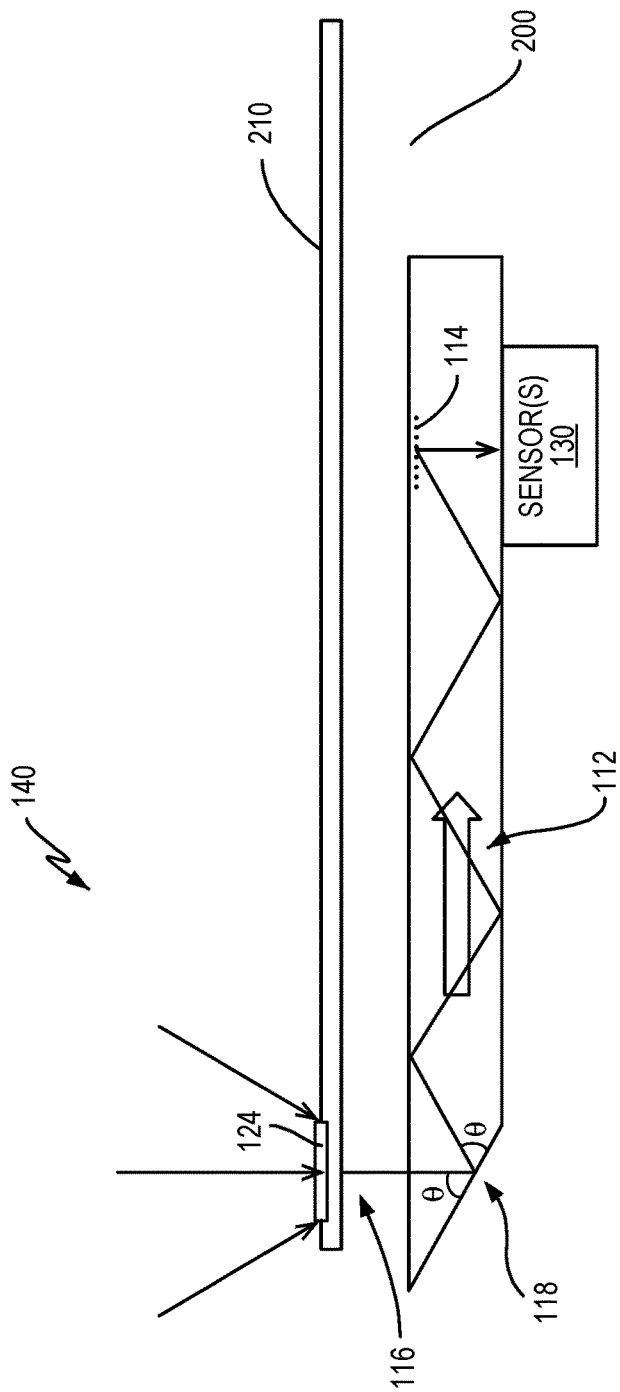
FIG. 6 shows an exemplary waveguide-based light detection system according to further exemplary embodiments of the solution presented herein.
Figure 7:
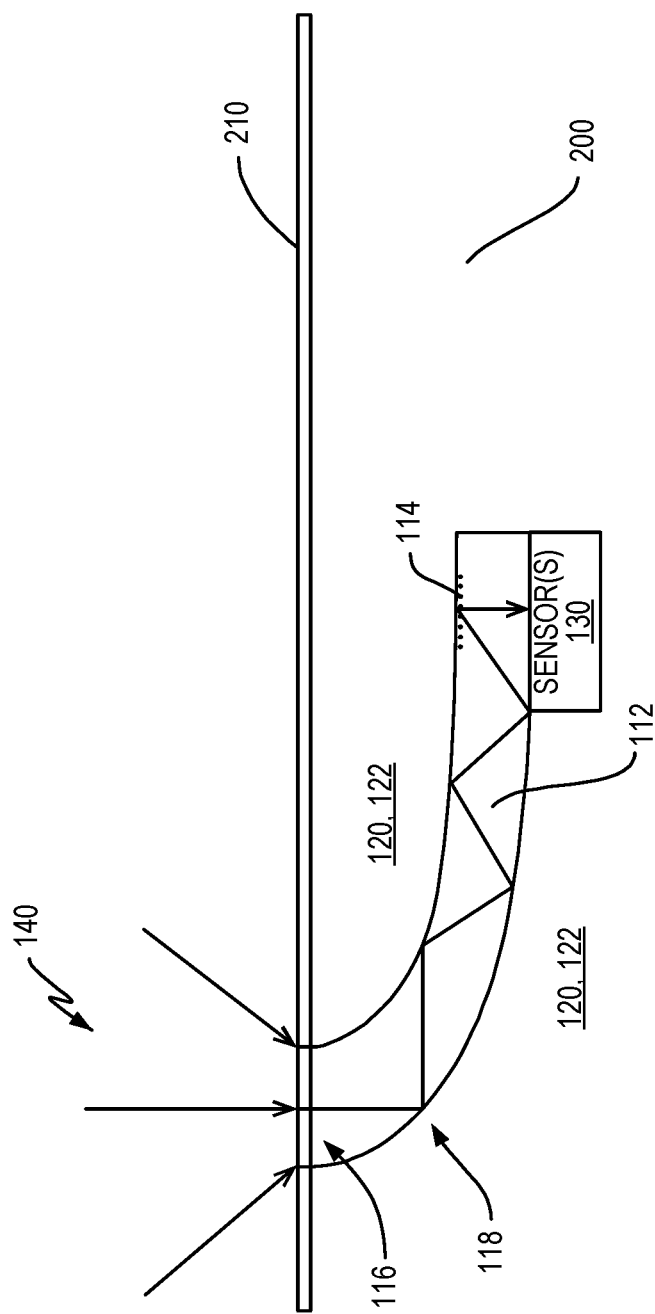
FIG. 7 shows an exemplary waveguide-based light detection system according to further exemplary embodiments of the solution presented herein.
Figure 8:
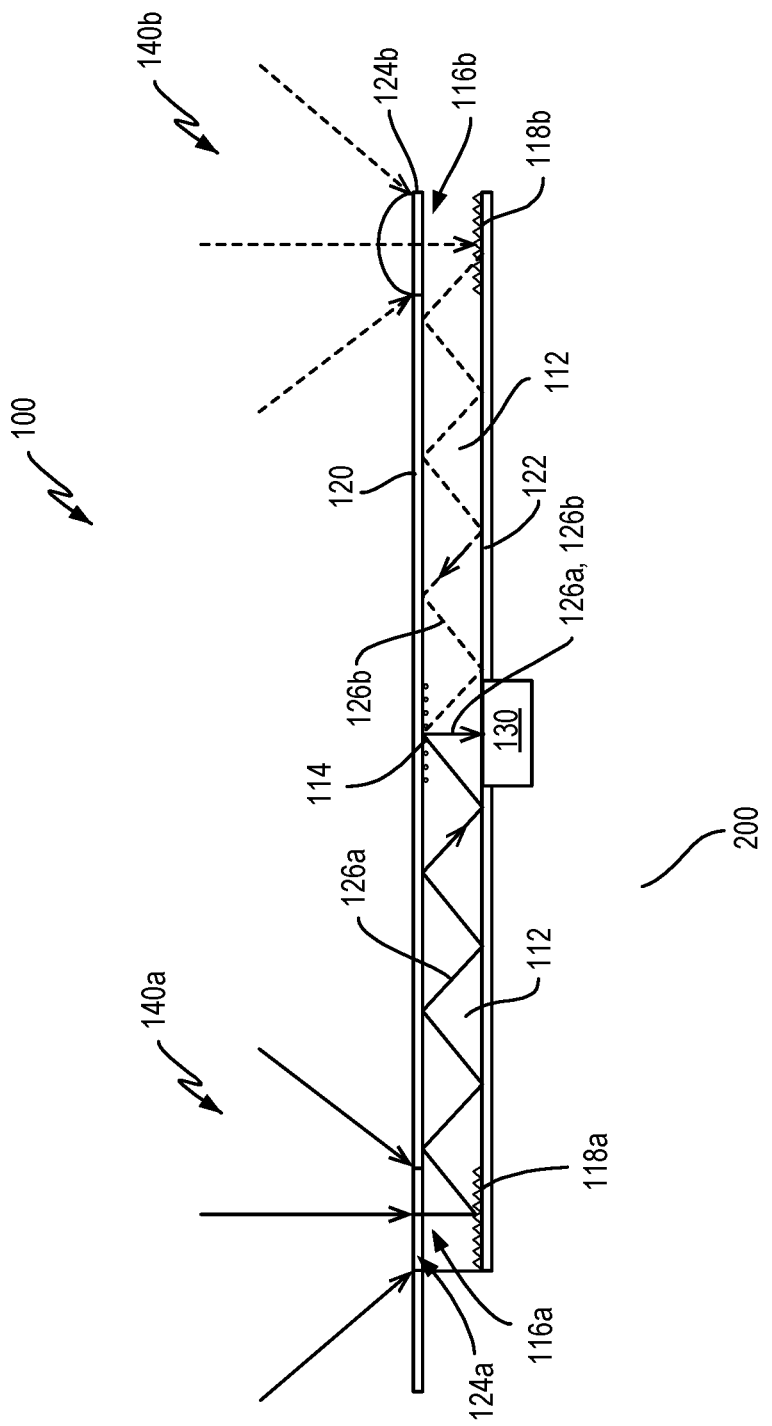
FIG. 8 shows an exemplary waveguide-based light detection system according to further exemplary embodiments of the solution presented herein.

The waveguide 110 may further comprise a light guiding element 118 opposite a corresponding waveguide entrance 116 that is configured to facilitate the propagation of the collected light from the waveguide entrance 116 along the TIR structure 112. In one exemplary embodiment, the light guiding element 118 comprises a reflector configured to reflect the light collected by the corresponding waveguide entrance 116 at a total internal reflection angle to facilitate the propagation of the collected light along the TIR structure 112. One exemplary reflector includes an angled mirror 118, as shown in FIG. 6, which reflects the incident light at an angle θ equivalent to the entry angle θ. To implement the total internal reflection, this angle θ may be equivalent to the total internal reflection angle for the waveguide 110. Additional reflectors include, but are not limited to, a plurality of etched surfaces, as shown in FIG. 8, mirror print or a material with a lower refractive index so that the angle θ of the light exiting the light guiding element 118 is the same as the angle of incidence on the light guiding element 118, etc. In another exemplary embodiment, the light guiding element 118 comprises a bend proximate the corresponding waveguide entrance 116, e.g., as shown in FIG. 7, where the bend is configured to direct the collected light at the total internal reflection angle to facilitate the propagation of the collected light along the TIR structure 112.

The exemplary light detection systems 100 of FIGS. 1 and 3-7 show a single waveguide entrance 116 providing light to a single sensor 130. The solution presented herein, however is not so limited. Alternative embodiments may include multiple waveguide entrances 116 that collect light for propagation along one or more corresponding waveguides 110 to the sensor 130. In some embodiments, multiple waveguide entrances 116 use the same waveguide 110 to propagate the light to a single sensor 130. In other embodiments, multiple waveguides 110 propagate light from one or more waveguide entrances 116 to a single sensor 130. In addition, the location of one or more waveguide entrances 116 relative to the sensor may be selected to reduce noise and/or increase the signal strength. For example, the lateral spacing between multiple waveguide entrances 116 and the corresponding sensor 130 may be configured such that the light entering the sensor 130 adds constructively. Alternatively or additionally, the lateral spacing between multiple waveguide entrances 116 and the corresponding sensor 130 may be configured such that interference present in the collected light adds destructively or neutrally.

Figure 9:
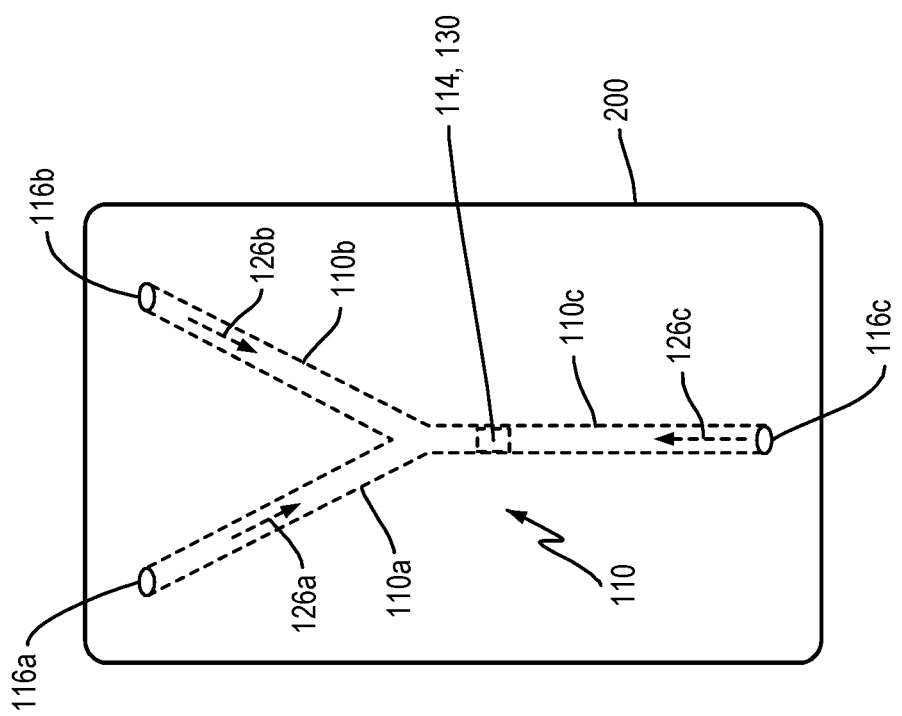
FIG. 9 shows an exemplary waveguide-based light detection system according to further exemplary embodiments of the solution presented herein.

FIGS. 8-9 show exemplary embodiments with multiple waveguide entrances 116 channeling light to a single sensor 130. As shown in FIG. 8, light sensor 130 may detect light originating from multiple waveguide entrances 116, e.g., a first waveguide entrance 116a and a second waveguide entrance 116b located on opposing sides of the TIR waveguide 110 from the light sensor 130. In this exemplary embodiment, waveguide entrance 116a and lens 124a collects light 140a, light guiding element 118a establishes the TIR angle for the collected light to propagate 126a the collected light along the TIR structure 112 towards the sensor 130 in a first direction. Further, waveguide entrance 116b and lens 124b collects light 140b, light guiding element 118b establishes the TIR angle for the collected light to propagate 126b the collected light along the TIR structure 112 towards the sensor 130 in a second direction opposite the first direction. The diffusive element 114 disrupts the propagation 126a, 126b, from both directions, of the light collected by the waveguide entrances 116a, 116b for detection by sensor 130.

In FIG. 9, light sensor 130 detects light originating from three waveguide entrances: 116a, 116b, 116c. In this exemplary embodiment, TIR waveguide 110 comprises multiple legs 110a, 110b, 110c, each of which respective propagate 126a, 126n, 126v light in different directions from the corresponding entrance 116a, 116b, 116a towards the light sensor 130, where the diffusive element 114 disrupts the propagating light to enable detection by the light sensor 130. It will be appreciated that the multiple legs 110a, 110b, 110c of FIG. 9 may represent different waveguides 110 that collectively channel collected light to a single sensor 130.

While exemplary detection systems 100 are shown as having one to three waveguide entrances 116, it will be appreciated that the detection system 100 disclosed herein may include any number of waveguide entrances 116. In general, detection system 100 may comprise any number of waveguide entrances 116 and/or waveguides 110, where each entrance 116 is located at a location of the waveguide 110 laterally displaced from the sensor 130 and diffusive element 114, such that light communications are implemented using fewer sensors 130 than waveguide entrances 116 and/or waveguides 110. In so doing, the solution presented herein reduces the number of sensors 130 associated with light communications, while simultaneously improving the quality of the light communications, e.g., by increasing the amplitude of the detected light. Further, by using waveguides 110 to direct the light from multiple entrances 116 to the sensor(s) 130, the solution presented herein relaxes limitations previously placed on the sensor(s) 130, e.g., the size, power, etc., because the sensor(s) 130 may now be placed at any suitable location in the device 200.

Figure 10:
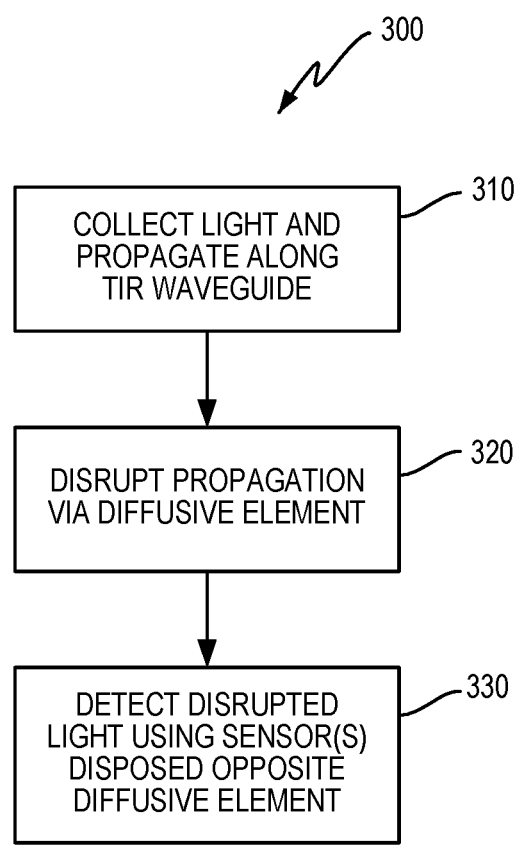
FIG. 10 shows an exemplary method for detecting light for light communications according to exemplary embodiments of the solution presented herein.

FIG. 10 shows an exemplary method 300 of detecting light associated with light communications. The method 300 comprises collecting light configured for the light communications via one or more waveguide entrances 116 disposed at different first locations along a total internal reflection TIR waveguide 110 (block 310), where the light comprises a plurality of wavelengths $\lambda_1$-$\lambda_N$. The TIR waveguide 110 comprises a TIR structure 112 having a first index of refraction $n_1$, where a second index of refraction $n_2$ and/or $n_3$ adjacent the TIR structure 112 is less than the first index of refraction $n_1$ such that light entering the TIR waveguide 110 propagates along the TIR structure 112. The method 300 further comprises disrupting the propagation of the light along the TIR waveguide 110 using a diffusive element 114 disposed along an internal edge of the TIR structure 112 at a second location of the TIR waveguide 110 (block 320). The second location is offset (laterally) along the TIR waveguide 110 from each of the one or more first locations. The method 300 further comprises detecting the disrupted light using one or more light sensors 130 disposed adjacent an edge of the TIR structure 112 opposite the second location and spaced from the diffusive element 114 by a thickness t of the TIR structure 112 (block 330). Each of the light sensor(s) 130 detects a subset $\lambda_m$-$\lambda_M$ of the plurality of wavelengths $\lambda_1$-$\lambda_N$ of the disrupted light, where the subset $\lambda_m$-$\lambda_M$ of the plurality of wavelengths $\lambda_1$-$\lambda_N$ comprises one or more wavelengths totaling fewer than the plurality of wavelengths, i.e., $((M-m)+1)<N$.

As mentioned above, the light detection system 100 of the solution presented herein may be implemented in and/or as part of any number of wireless devices 200 that implement light communications. Exemplary devices 200 may be worn and/or carried by a user, where the light detection system 100 disclosed herein may be internal to a housing of a device 200, disposed partially internally to the device 200 and partially integrated with/disposed on the housing of the device, or implemented on an external surface of the housing of the device 200.

Figure 11A:
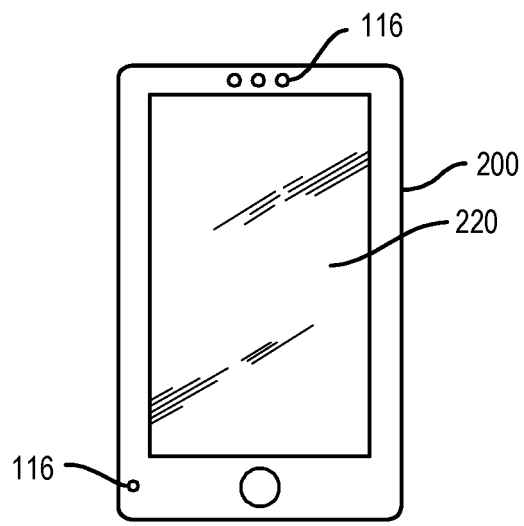
FIGS. 11A-11C show an exemplary device comprising the light detection system according to exemplary embodiments of the solution presented herein.
Figure 11B:
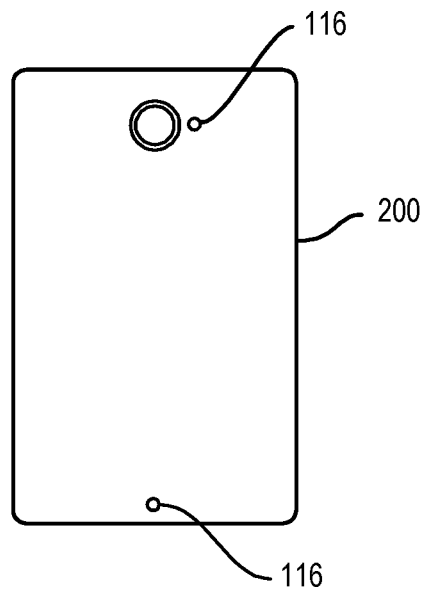
Figure 11C:
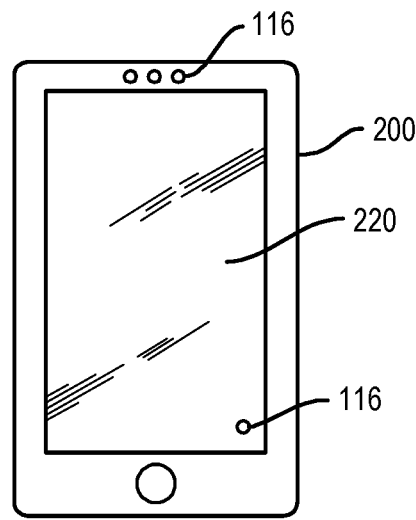

FIGS. 11A-11C show an exemplary smart phone device 200. Smart phone device 200 may comprise waveguide entrances 116 around the display 220 along the perimeter of the housing 210, as shown in FIGS. 11A and 11C. Alternatively or additionally, device 200 may comprise waveguide entrances on a back of the smart phone device 200, as shown in FIG. 11B, and/or integrated with the display 220, as shown in FIG. 11C. It will be appreciated that the integration of waveguide entrance(s) 116 with the display 220 may include placing the waveguide entrance(s) 116 below a transparent type of display 220, e.g., an Active-Matrix Organic Light-Emitting Diode (AMOLED) screen/display. It will further be appreciated that the waveguide solution presented herein enables multiple waveguide entrances 116 to be placed at any suitable location on the smart phone device 200, besides those explicitly shown, while simultaneously enabling a single sensor 130 (or fewer sensors 130 than there are waveguide entrances 116), placed in the device 200 at any location suitable for the sensor 130, to detect the light from the multiple entrances 116, and thus enable the light communications.

Figure 12:
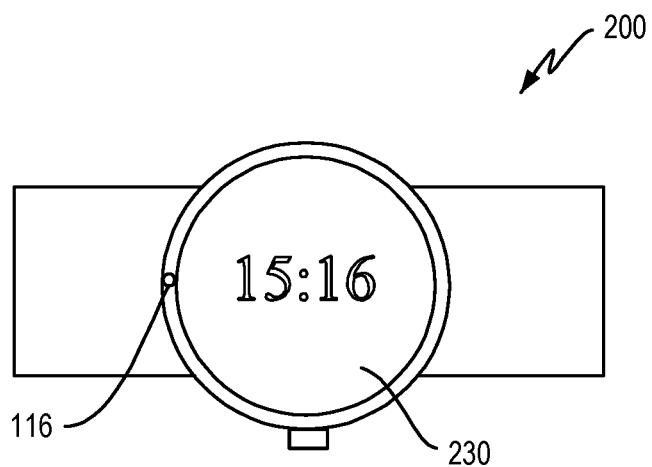
FIG. 12 shows an exemplary device comprising the light detection system according to further exemplary embodiments of the solution presented herein.
Figure 13:
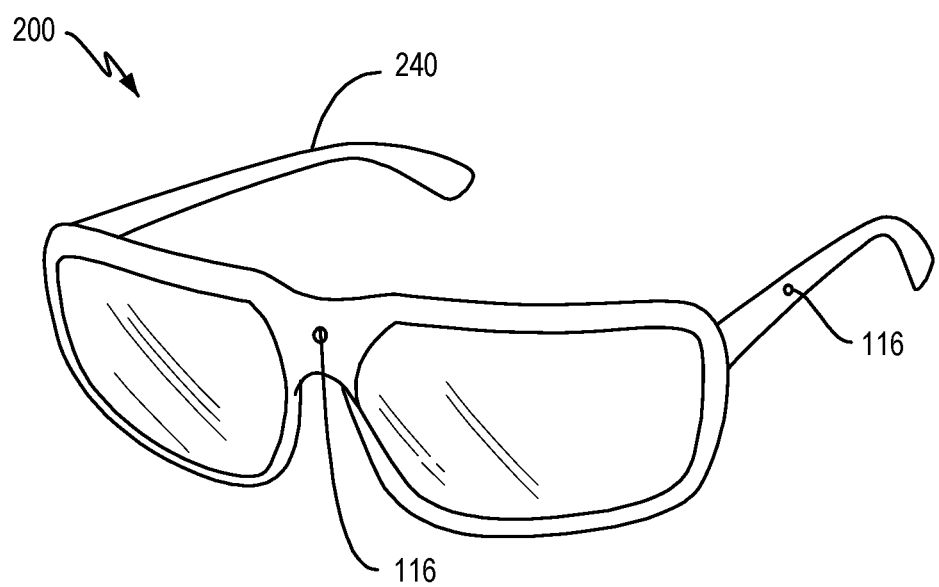
FIG. 13 shows an exemplary device comprising the light detection system according to further exemplary embodiments of the solution presented herein.

In another exemplary embodiment, the device 200 comprises a watch, as shown in FIG. 12. For the watch embodiment, the waveguide entrances 116 may be placed at any suitable location, e.g., around the face 230 of the watch and/or in a bezel of the watch, integrated with the display of the watch (not shown), as part of the face of the watch (not shown), etc. In yet another exemplary embodiment, shown in FIG. 13, the device 200 comprises glasses, where the waveguide entrances 116 are disposed along a frame 240 of the glasses. In addition to the smartphone, watch, and glasses implementations discussed herein, the solution presented herein is also applicable to any wireless devices implementing light communications. For example, other exemplary devices 200 include, but are not limited to, hearing aids, fitness monitors, cellular telephones, laptop computers, tablets, etc.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A detection system for light communications, the detection system comprising:
   a total internal reflection (TIR) waveguide comprising:
      a first structure having a first index of refraction, wherein a second index of refraction adjacent the first structure is less than the first index of refraction such that light for light communications input to the TIR waveguide propagates along the TIR waveguide within the first structure, said light comprising a plurality of wavelengths;

a diffusive element disposed along an internal edge of the first structure at a first location of the TIR waveguide, said diffusive element configured to disrupt the propagation of the light along the TIR waveguide by scattering the light incident on the diffusive element; and one or more waveguide entrances, each at a corresponding second location wherein each of said second locations is offset along the TIR waveguide from the first location, each of the one or more waveguide entrances configured to:
collect the light associated with the light communications; and
input the collected light to the first structure at the corresponding second location; and one or more light sensors disposed adjacent an edge of the first structure opposite the first location and each spaced from the diffusive element by a thickness of the first structure, wherein each of said one or more light sensors detect a subset of the plurality of wavelengths of the disrupted light, said subset of the plurality of wavelengths comprising one or more wavelengths totaling fewer than the plurality of wavelengths.

2. The detection system of claim 1 wherein:
the one or more light sensors comprise one or more wavelength-specific light sensors; and
each of the one or more wavelength-specific light sensors is configured to detect a different subset of the plurality of wavelengths.

3. The detection system of claim 1 wherein at least one of the one or more waveguide entrances comprises a wavelength-specific element configured to collect wavelength-specific light corresponding to one subset of the plurality of wavelengths to input the wavelength-specific light to the first structure.

4. The detection system of claim 3 wherein the one or more light sensors comprise one or more wavelength-specific light sensors, where each of the one or more wavelength-specific light sensors is configured to detect a different one of the one or more wavelengths in the one subset of the plurality of wavelengths.

5. The detection system of claim 3 wherein the wavelength-specific element comprises a wavelength-specific filter.

6. The detection system of claim 3 wherein the wavelength-specific element comprises a prism configured to split the collected light so as to input the wavelength-specific light into the first structure.

7. The detection system of claim 1 wherein:
the TIR waveguide comprises one waveguide entrance and a plurality of paths originating at the one waveguide entrance and physically spaced from each other;
each of the plurality of paths corresponds to a different subset of the plurality of wavelengths;
the one waveguide entrance comprises a wavelength-specific element configured to input wavelength-specific light corresponding to each of the different subsets into the corresponding one of the plurality of paths of the TIR waveguide.

8. The detection system of claim 7 wherein:
each of the different subsets comprises a different one of the plurality of wavelengths;
the wavelength-specific element comprises a prism configured to separate the light collected at the one waveguide entrance into each of the different one of the plurality of wavelengths; and
wherein each of the plurality of paths originate at the one waveguide entrance and are physically spaced from each other so as to align with an output angle of the prism such that each of the plurality of paths receives wavelength-specific light associated with a different one of the plurality of wavelengths.

9. The detection system of claim 1 wherein the TIR waveguide is configured to collect, propagate, and disrupt wavelength-specific light corresponding to one subset of the plurality of wavelengths.

10. The detection system of claim 1 wherein the detection system is part of a portable device configured to be worn by a user.

11. The detection system of claim 1 wherein the diffusive element comprises:
a painted areal along the inner edge of the first structure at the first location;
a roughened area along the inner edge of the first structure at the first location; or
a plurality of machined dots along the inner edge of the first structure at the first location.

12. A method of detecting light associated with light communications, the method comprising:
collecting light configured for the light communications via one or more waveguide entrances disposed at different first locations along a total internal reflection (TIR) waveguide, said light comprising a plurality of wavelengths and said TIR waveguide comprising a first structure having a first index of refraction, wherein a second index of refraction adjacent the first structure is less than the first index of refraction such that light entering the TIR waveguide propagates along the TIR waveguide within the first structure;

disrupting the propagation of the light along the TIR waveguide using a diffusive element disposed along an internal edge of the first structure at a second location of the TIR waveguide to scatter the light incident on the diffusive element, said second location offset along the TIR waveguide from each of the one or more first locations; and detecting the disrupted light using one or more light sensors disposed adjacent an edge of the first structure opposite the second location and spaced from the diffusive element by a thickness of the first structure, wherein each of said one or more light sensors detect a subset of the plurality of wavelengths of the disrupted light, said subset of the plurality of wavelengths comprising one or more wavelengths totaling fewer than the plurality of wavelengths.

13. The method of claim 12 wherein:
the one or more light sensors comprise one or more wavelength-specific light sensors; and
said detecting the disrupted light comprises detecting, using each of the one or more wavelength-specific light sensors, a different subset of the plurality of wavelengths.

14. The method of claim 12 wherein:
at least one of the one or more waveguide entrances comprises a wavelength-specific element configured to collect wavelength-specific light corresponding to one subset of the plurality of wavelengths; and
said collecting the light comprises inputting the wavelength-specific light to the first structure.

15. The method of claim 14 wherein:
the one or more light sensors comprise one or more wavelength-specific light sensors; and
said detecting the disrupted light comprises detecting, using each of the one or more wavelength-specific light sensors, a different one of the one or more wavelengths in the one subset of the plurality of wavelengths.

16. The method of claim 14 wherein:
the wavelength-specific element comprises a wavelength-specific filter; and
said collecting the light comprises filtering the light configured for the light communications to input the wavelength-specific light to the first structure.

17. The method of claim 14 wherein:
the wavelength-specific element comprises a prism configured to split the light configured for the light communications into wavelength-specific light; and
said collecting the light comprises inputting the wavelength-specific light into the first structure.

18. The method of claim 12 wherein:
the TIR waveguide comprises one waveguide entrance and a plurality of paths originating at the one waveguide entrance and physically spaced from each other;
each of the plurality of paths corresponds to a different subset of the plurality of wavelengths;
said collecting the light comprises inputting wavelength-specific light corresponding to each of the different subsets into the corresponding one of the plurality of paths of the TIR waveguide.

19. The method of claim 18 wherein:
each of the different subsets comprises a different one of the plurality of wavelengths;
said inputting the wavelength-specific light comprises:
separating the light configured for light communications at the one waveguide entrance into each of the different one of the plurality of wavelengths; and
inputting each of a different one of the plurality of wavelengths into a corresponding one of the different paths of the TIR waveguide.

20. The method of claim 12 wherein the diffusive element comprises:
a painted areal along the inner edge of the first structure at the first location;
a roughened area along the inner edge of the first structure at the first location; or
a plurality of machined dots along the inner edge of the first structure at the first location.

* * * * *

UNITED STATES PATENT AND TRADEMARK OFFICE
CERTIFICATE OF CORRECTION

PATENT NO. : 10,958,340 B2  
APPLICATION NO. : 16/407518  
DATED : March 23, 2021  
INVENTOR(S) : Hunt et al.

Page 1 of 1

It is certified that error appears in the above-identified patent and that said Letters Patent is hereby corrected as shown below:

In the Specification

In Column 6, Line 42, delete "be any" and insert -- be of any --, therefor.

In Column 6, Line 51, delete "such that the each" and insert -- such that each --, therefor.

In Column 7, Line 20, delete "$\lambda_1\text{-}\lambda_N$," and insert -- $\lambda_1\text{-}\lambda_7$, --, therefor.

In Column 7, Line 32, delete "$\lambda$ being" and insert -- $\lambda_7$ being --, therefor.

In Column 8, Lines 4-5, delete "(e.g., FIG. 7)," and insert -- (e.g., FIG. 6), --, therefor.

In Column 9, Line 18, delete "126*a*, 126*n*, 126*v*" and insert -- 126*a*, 126*b*, 126*c* --, therefor.

In Column 9, Line 19, delete "116*a*, 116*b*, 116*a*" and insert -- 116*a*, 116*b*, 116*c* --, therefor.

In Column 10, Line 19, delete "housing 210," and insert -- housing 200, --, therefor.

In the Claims

In Column 12, Line 19, in Claim 11, delete "painted areal" and insert -- painted area --, therefor.

In Column 14, Line 18, in Claim 20, delete "painted areal" and insert -- painted area --, therefor.

Signed and Sealed this  
Twenty-fifth Day of January, 2022

Drew Hirshfeld  
*Performing the Functions and Duties of the*  
*Under Secretary of Commerce for Intellectual Property and*  
*Director of the United States Patent and Trademark Office*